United States Patent [19]

Kirimoto et al.

[11] Patent Number: 4,996,532
[45] Date of Patent: Feb. 26, 1991

[54] DIGITAL BEAM FORMING RADAR SYSTEM

[75] Inventors: Tetsuo Kirimoto; Takahiko Fujisaka; Yoshimasa Ohashi, all of Kanagawa, Japan

[73] Assignee: Mitsubishi Denki Kabushiki Kaisha, Tokyo, Japan

[21] Appl. No.: 450,290

[22] Filed: Dec. 13, 1989

[30] Foreign Application Priority Data

Dec. 16, 1988 [JP] Japan ................... 63-317772

[51] Int. Cl.$^5$ ........................... G01S 7/36; G01S 7/42
[52] U.S. Cl. .......................... 342/81; 342/83; 342/17; 342/18
[58] Field of Search .................. 342/17, 18, 81, 83

[56] References Cited

U.S. PATENT DOCUMENTS

| | | | |
|---|---|---|---|
| 4,151,527 | 4/1979 | Masliah et al. | 342/83 |
| 4,358,766 | 11/1982 | Mehron | 342/28 |
| 4,656,479 | 4/1987 | Kirimoto et al. | 342/94 |
| 4,724,438 | 2/1988 | Arnold et al. | 342/158 |

OTHER PUBLICATIONS

Ruvin et al., "digital Multiple Beamforming Techniques for Radar", Eascon '78, IEEE, pp. 152-163.

Primary Examiner—Gilberto Barrón, Jr.
Attorney, Agent, or Firm—Wolf, Greenfield & Sacks

[57] ABSTRACT

A radar system having improved interference resistance. A transmitting section includes an oscillator capable of switching the oscillation frequency, and a transmitting antenna connected to said oscillator and capable of transmitting electric waves having specified transmitting frequencies transmitted in different directions in a specified order to enable a desired range to be scanned. The oscillator and the transmitting antenna are designed to operate so that every time one scanning is completed or every time the transmitting direction is changed during each scanning period, the transmitting frequency may be changed. The receiver can simultaneously form a plurality of beams in the scanning range, convert the received signals to digital signals, and output signals indicating the frequencies and arrival directions of the received signals. The operating mode of the transmitting section may be altered in accordance with the frequency and arrival direction of the received waves.

17 Claims, 6 Drawing Sheets

DIGITAL BEAM FORMING RADAR SYSTEM

BACKGROUND OF THE INVENTION

1. Field of the Invention

The present invention relates to a DBF radar system employing as a receiving antenna a digital beam forming (DBF) antenna adapted to form a multiplicity of narrow beams, and more particularly to an improvement in interference resistant characteristics of a radar system.

2. Statement of Prior Art

Digital beam forming antenna systems are well known. The article title "DIGITAL MULTIPLE BEAM FORMING TECHNIQUES FOR RADAR" by Abraham E. Ruvin et al, EASCON—'78, pp 152–163 discloses such a receiving DBF antenna system in which signals received respectively by a plurality of antenna elements are connected to digital signals and then these digital signals are processed to simultaneously form a multiplicity of beams. U.S. Pat. No. 4,656,479 issued to Kirimoto et al on Apr. 7, 1987 titled "RADAR SYSTEM" discloses such a radar system including a transmitting section and receiving section, wherein electric waves transmitted from the transmitting section are received by a transponder and electric waves from the transponder are then received by a multiplicity of antenna elements of the receiving section, so that the signals received by the antenna elements are converted to digital signals which are in turn processed to determine the direction in which said received electric waves arrived.

In case of monitoring an object by use of a radar system employing such a digital beam forming antenna system, a problem is encountered in that the radar system may be easily affected by interference, should such an object be equipped with any means for generating interference. This possibility will now be explained with reference to FIG. 1.

Figure 1:
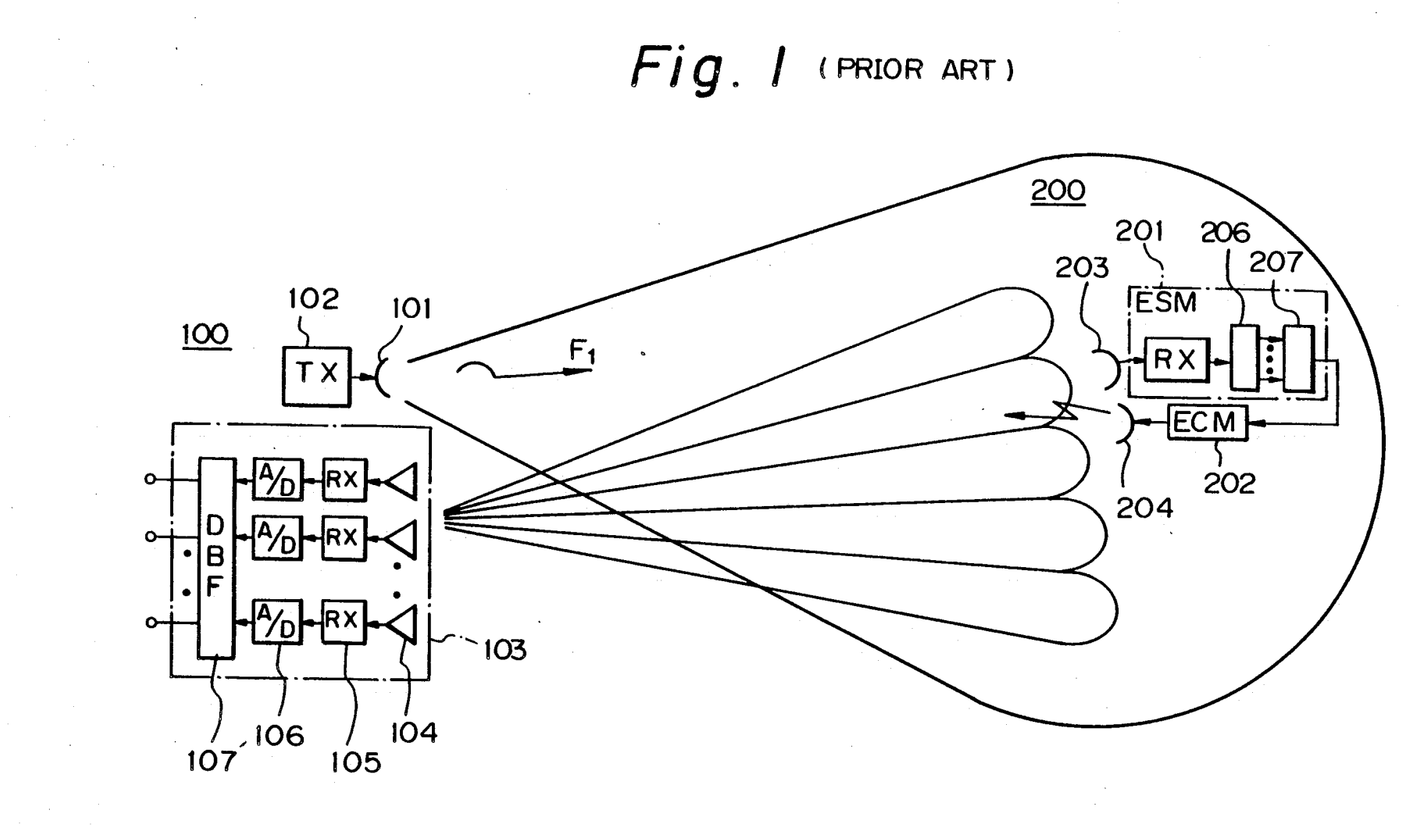
FIG. 1 schematically illustrates the constitution of a radar system according to the prior art employing the digital beam forming technology at the receiving section, and the positional relationship between the radar system and an interference apparatus.

FIG. 1 schematically illustrates the positional relationship between a radar apparatus 100 which employs a digital beam forming (DBF) antenna system and an interference apparatus 200 with which an object is equipped. It can be seen from FIG. 1 that a transmitting antenna 101 which forms a wide angle beam is connected to a transmitter 102 and serves to transmit into space an electric wave having the frequency of $F_1$.

A DBF receiver 103 includes a plurality of antenna elements 104 which are arranged in one dimension or two dimensions. The respective antenna elements 104 supply the received electric waves to receivers 105. The signals output from the respective receivers 105 are then converted to digital signals by A/D converters 106. A plurality of digital signals are simultaneously transferred from the respective A/D converters 106 and input to a beam former (an operating means) 107 adapted to effect DFT (Digital Fourier Transform), which discriminates the received electric waves with respect to the incoming directions and supplies outputs in accordance with the respective particular directions. A non-scanning DBF antenna system for a mulitplicity of narrow beams is thus made by the above-described components from the antenna elements 104 through the beam former 107 and may be used as a receiving antenna.

The interference apparatus 200 situated on the object includes a radar wave analyzing device 201 which is called an ESM (Electronic Support Measures) and an interference wave generating device 202 which is called an ECM (Electronic Counter Measure). ESM 201 is connected to a receiving antenna 203, while ECM 202 is connected to a transmitting antenna 204. The radar wave analyzing device 201 includes a multichannel receiver 205 which receives only a predetermined electric wave out of the electric waves received by the receiving antenna 203, a signal characteristics extracting device 206 adapted to extract characteristics (such as pulse duration, frequency, pulse amplitude, etc.) of the signals output from the multichannel receiver 205 and a signal analyzing device 207 which analyzes the signals in accordance with the characteristics output from the signal characteristics extracting device 206. The interference wave generating device 202 generates interference waves equivalent to the received radar waves based on the information received from the signal analyzing device 207 and transmits the interference waves through the transmitting antenna 204.

At the side of the DBF radar 100, an electric wave having a frequency of Fi is transmitted over a wide range by the use of the wide angle beam transmitting antenna 101. The reflection echo which has been reflected by the object is received by the DBF receiver 103. The reflected echo is received by the beam former 107 by way of the antenna element 104, the receiver 105 and the A/D converter 106. The beam former 107 effects the Fourier Transform on the digitized signals and simultaneously forms a plurality of beams. The received electric waves are thus discriminated and output with respect to each of the incoming directions to provide information on the position, speed, etc. of the respective objects. The DBF receiver 103 is capable of forming a plurality of narrow beams at the same time and classifying a plurality of reflected echos of the frequency $F_1$ received simultaneously from different directions in accordance with the directions in which the echos arrive.

At the side of the object, the channelized receiver 205 receives the radar wave through the receiving antenna 203. The signal characteristics extracting device 206 extracts the characteristics of the received radar wave which is in turn analyzed in accordance with the pulse duration, frequency, pulse amplitude, etc. of the output from the signal analyzer 207. Subsequently, when the radar wave has been analyzed, the interference wave generating device 202 generates an interference wave equivalent to the received radar wave and transmits the interference wave to the DBF radar 100 by way of the transmitting antenna 204.

Since the DBF radar 100 transmits an electric wave having the specific frequency $F_1$ over a wide range, the transmission of such an electric wave may be easily detected and analyzed by the ESM of the opponent and, as a consequence, the DBF radar 100 is readily interfered by the electric wave having an identical frequency $F_1$.

SUMMARY OF THE INVENTION

A general object of the present invention is to solve the above-mentioned problems.

Another object of the present invention is to provide a radar system which hardly susceptible to interference by a wave emitted by interference apparatus in a scanning area.

A further object of the present invention is to provide a radar system which makes it difficult for an interference apparatus to analyze the frequency of a transmitted wave and which thereby enhances resistance against interference.

In order to attain the above-mentioned objects, the radar system according to the present invention includes an oscillation means for generating a plurality of different frequencies. To the oscillation means is connected a transmitting antenna means capable of causing a desired area to be scanned by transmitting an electric wave having one of the plurality of frequencies in different directions in a predetermined sequence. A control means is adapted to synchronize the operations of the oscillation means and the transmitting antenna means and operates the oscillation means and the transmitting antenna means in any one of, or a combination of, the mode in which the transmission frequency is changed every time a scanning operation has been completed, the mode in which the transmission frequency is changed in a predetermined order every time the transmission direction is changed in the respective scanning period, and the mode in which the transmission frequency is changed at random every time the transmission direction is changed in the respective scanning period. The radar system is also provided with a receiving means which is capable of simultaneously forming a plurality of receiving beams in the scanned area and converting received signals to digital signals to perform a digital arithmetic operation on the digital signals so as to output signals representing the directions and the frequencies of the received signals. By utilizing these signals, it is possible to change the transmission mode depending on the directions and the frequencies of the received signals.

According to an embodiment of the present invention, the radar system includes a transmitting section, a control section and a receiving section.

The transmitting section includes:

(1) an oscillator for generating a plurality of different frequencies;

(2) a phased array antenna including a plurality of antenna elements connected to the oscillator; and (3) a scanning controller for causing the plurality of antenna elements to form a beam in different directions in a predetermined sequence to allow a desired area to be scanned, said beam having a plurality of frequencies.

The control section operates the oscillator to change the oscillation frequency in synchronism with the change in the transmission direction by the scanning controller to operate the transmitting section in any one, or a combination of, the mode in which the transmission frequency is changed every time one scanning operation is completed, the mode in which the transmission frequency is changed in a predetermined order every time the transmission direction is changed during each scanning period and the mode in which the transmitting frequency is changed at random every time the transmission direction is changed during the respective scanning period.

The receiving section includes:

(1) a plurality of reception antenna elements capable of receiving incoming electric waves;

(2) a plurality of filter banks each connected to a corresponding one of said plurality of reception antenna elements to discriminate the plurality of frequencies to output signals corresponding to the plurality of frequencies contained in the output signals from the corresponding antenna element;

(3) a plurality of A/D converters each connected to a corresponding one of the filter banks and controlled by the control section to convert the signals output from the corresponding filter bank to digital signals, and (4) a digital beam former which receives the digital signals output from the plurality of A/D converters performs a digital arithmetic operation on the digital signals to cause the plurality of reception antenna elements to simultaneously form a plurality of beams in the scanned area so as to output signals indicating the directions and the frequencies of the received electric waves.

The control section operates the oscillator to change the oscillation frequency in synchronism with a change in the transmission direction by the scanning controller.

The oscillator preferably comprises a frequency synthesizer which is capable of generating a plurality of frequencies.

The control section operates to change the oscillation frequency of the frequency synthesizer every time one scanning operation is completed or every time the transmission direction is changed.

The control section also operates to change the transmission mode depending on the directions and the frequencies of the received electric waves.

The above and other objects as well as the features of the present invention may be fully understood by those skilled in the art by reading the following detailed description in conjunction with the accompanying drawings illustrating some embodiments of the present invention.

BRIEF DESCRIPTION OF THE DRAWINGS

Throughout all the drawings, like numerals and symbols designate like or corresponding components or elements.

DETAILED DESCRIPTION OF THE PREFERRED EMBODIMENTS

Figure 2:
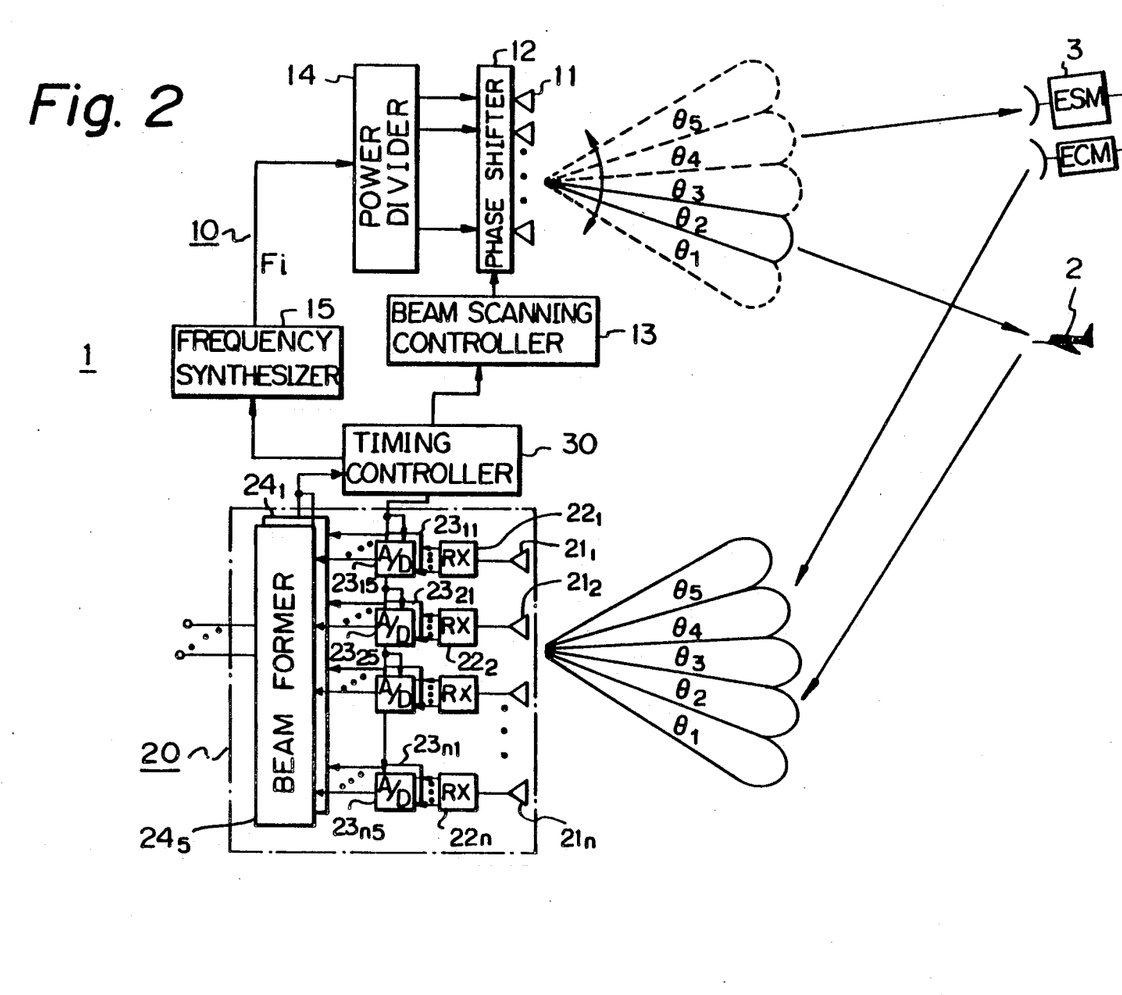
FIG. 2 schematically illustrates the entire constitution of one embodiment of a radar system according to the present invention, and the positional relationship between the radar system, an object and an interference apparatus.

FIG. 2 is a block diagram illustrating the entire constitution of one embodiment of a digital beam forming (DBF) radar system according to the present invention. In FIG. 2, a DBF radar system 1 includes a transmitting section 10 and a receiving section 20. The transmitting section 10 has a phased array antenna system including a plurality of antenna elements 11 arranged in a predetermined pattern, a phase shifting unit 12 adapted to shift the phases of transmission signals supplied to the respective antenna elements and a beam scanning control unit 13 which controls the phase shifting unit 12 to allow a narrow single beam to be formed by a plurality of antenna elements 11 and a desired range to be scanned at a high speed by the narrow beam. The input of the phase shifting unit 12 is connected through a power distributer 14 to a frequency synthesizer 15 which operates as a transmission wave generating source capable of changing its oscillation frequency Fi.

Figure 3:
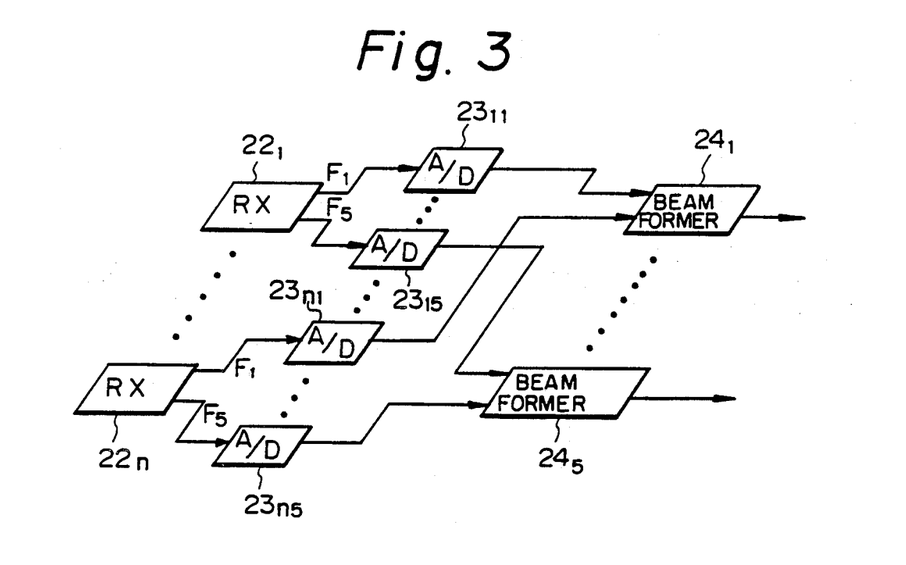
FIG. 3 illustrates how the receivers, the A/D converters and the beam formers are interconnected.

The receiving section 20 includes a plurality n of antenna elements $21_1$ through $21_n$ and receivers $22_1$ through $22_n$ connected to the respective antenna elements. The respective receivers are capable of outputting a plurality (five in this example) of signals having different frequencies and the respective output signals are supplied to corresponding A/D converters. As shown in FIG. 3, for example, five output signals respectively having frequencies $F_1$–$F_5$ from the receiver $22_1$ are applied respectively to corresponding A/D converters $23_{11}$–$23_{15}$. Similarly, five signals respectively having frequencies $F_1$–$F_5$ output from the n-th receiver $22_n$ are applied respectively to five corresponding A/D converters $23_{n1}$–$23_{n5}$.

As illustrated in FIG. 3, the signals having the frequency $F_1$ are supplied to the A/D converters $23_{11}, \ldots, 23_{n1}$, the output of which are applied to a beam former $24_1$. The same can be said with the remaining A/D converters. The outputs of the A/d converters $23_{15}, \ldots, 23_{n5}$ to which the signals having the frequency $F_5$ are supplied are applied to a beam former $24_5$.

Figure 4:
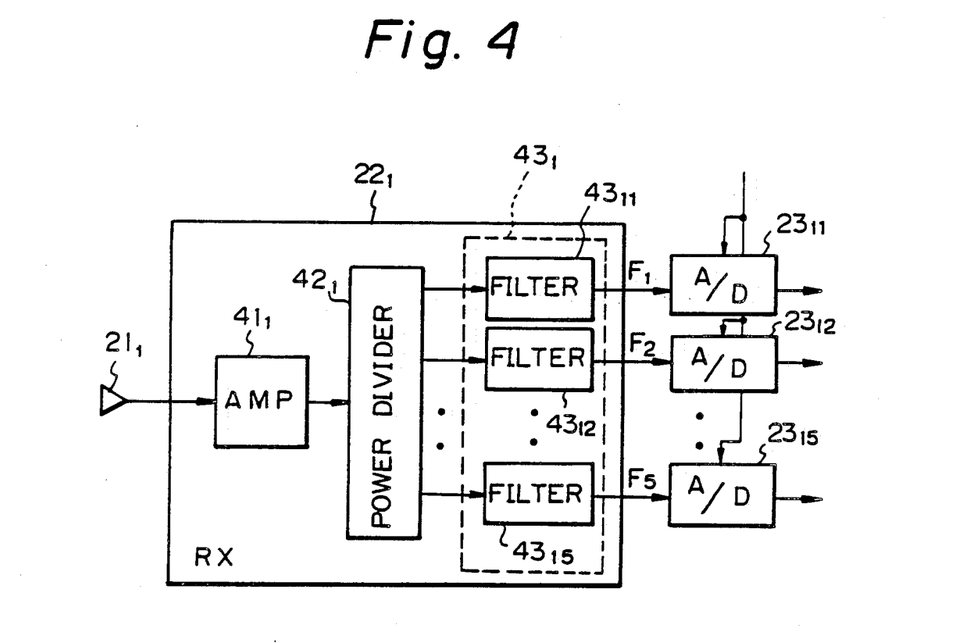
FIG. 4 schematically illustrates the constitution of the receiver shown in FIG. 3.

The receivers $22_1$–$22_n$ in the receiving section 20 are all of identical constitution. Taking the receiver $22_1$ as an example, the constitution of the receiver $22_1$ will next be explained by referring to FIG. 4. In FIG. 4, the receiver $22_1$ includes an amplifier $41_1$ which receives a signal from the antenna element $21_1$ and amplifies the same, and a power distributor $42_1$ which distributes the signal amplified by the amplifier $41_1$ to five filters $43_{11}$–$43_{15}$ in a filter bank $43_1$. The filters $43_{11}$–$43_{15}$ are operable to take out signals containing frequency components $F_1$–$F_5$, respectively, and supply them to the corresponding A/D converters $23_{11}, 23_{12}, \ldots, 23_{15}$.

Referring back again to FIG. 2, the operation timing of the beam scanning control unit 13, the frequency synthesizer 15 and the respective A/D converters $23_{11}$–$23_{n5}$ in the receiving section 20 can be controlled by a timing controller 30. The timing controller 30 comprises a micro-processor and operates to select any one of, the mode in which the transmission frequency is changed in a predetermined order every time one scanning is completed, the mode in which the transmission frequency is changed in each transmission direction in one scanning and the mode in which the transmission frequency is changed at random in each transmission direction in one scanning, and so programmed that the operation may be executed according to the selected mode.

The operation will next be explained.

When an electric wave is transmitted to the object 2 through the antenna elements 11 in the transmitting section 10, the timing controller 30 controls the operation timing of the beam scanning control unit 13 and the frequency synthesizer 15 so that they may operate synchronously. More specifically, the timing controller 30 controls the operation of the beam scanning control unit 13 and causes a single narrow beam which has been formed by a plurality of antenna elements 11 to scan a desired range at a high speed. Simultaneously, the timing controller 30 selects one out of the above-mentioned three modes and controls the frequency synthesizer 15 such that the transmission signals may be transmitted from the transmitting section 10 in accordance with the selected mode. In the embodiment illustrated in FIG. 2, the timing controller 20 synchronously controls the beam scanning control unit 13 and the frequency synthesizer 15 so that the surveillance range comprised of five subsections may be scanned by the transmission beam. The electric wave having any one of the frequencies $F_1$–$F_5$ allocated is transmitted in any one of the transmission directions $\theta_1$–$\theta_5$ corresponding respectively to the subsections as described above. In this manner, the timing controller 30 causes the beam scanning control unit 13 to change the transmission directions $\theta_1$–$\theta_5$ and the frequency synthesizer 15 to change the frequency.

While the transmission section 10 performs the scanning in a predetermined range by transmitting the electric wave in sequence in five different transmission directions $\theta_1$–$\theta_5$, the beam formers $24_1$–$24_5$ in the receiving section 20 form at the same time five beams in the directions $\theta_1$–$\theta_5$ so as to receive the electric wave arriving in the same directions $\theta_1$–$\theta_5$ as the transmitting directions. Accordingly, if there is the object 2 or the ESM 3 in the range scanned by the transmitting section 10, the electric wave reflected by the object 2 of the interfering wave emitted by the ESM 3 arrives at the receiving section 20 in one of the directions $\theta_1$–$\theta_5$ and is received by the antenna elements $21_1$–$21_n$. The signal thus received is then amplified by the amplifiers in the receivers $22_1$–$22_n$ and supplied to the filters through the power distributers. The frequency of the received signal is discriminated by the filters and the signals output from the filters for each frequency are supplied to the corresponding A/D converters. The timing controller 30 controls the A/D converters $23_{11}$–$23_{n5}$ such that the A/D converters can operate synchronously. The signals for the respective frequencies which have been converted from analog to digital signals are supplied to the beam formers $24_1$–$24_5$ corresponding to the respective frequencies and then subjected to the Fourier Transform. In this manner, the respective beam formers $24_1$–$24_5$ discriminate the received signal components for each receiving direction $\theta_1$–$\theta_5$ and generate the corresponding output signals and, therefore, information relating to the direction, frequency and electric power of the received signal can be obtained from the receiving section 20.

The three operation modes of the transmitting section 10 which are to be selected and controlled by the timing controller 30 will now be explained by referring to FIGS. 5(a)–(c) which illustrates the relationship among the transmission directions $\theta_1$–$\theta_5$, the frequencies of the electric waves to be transmitted in the respective transmission direction and the timing of receiving the signals in the receiving directions $\theta_1$–$\theta_5$.

Figure 5A:
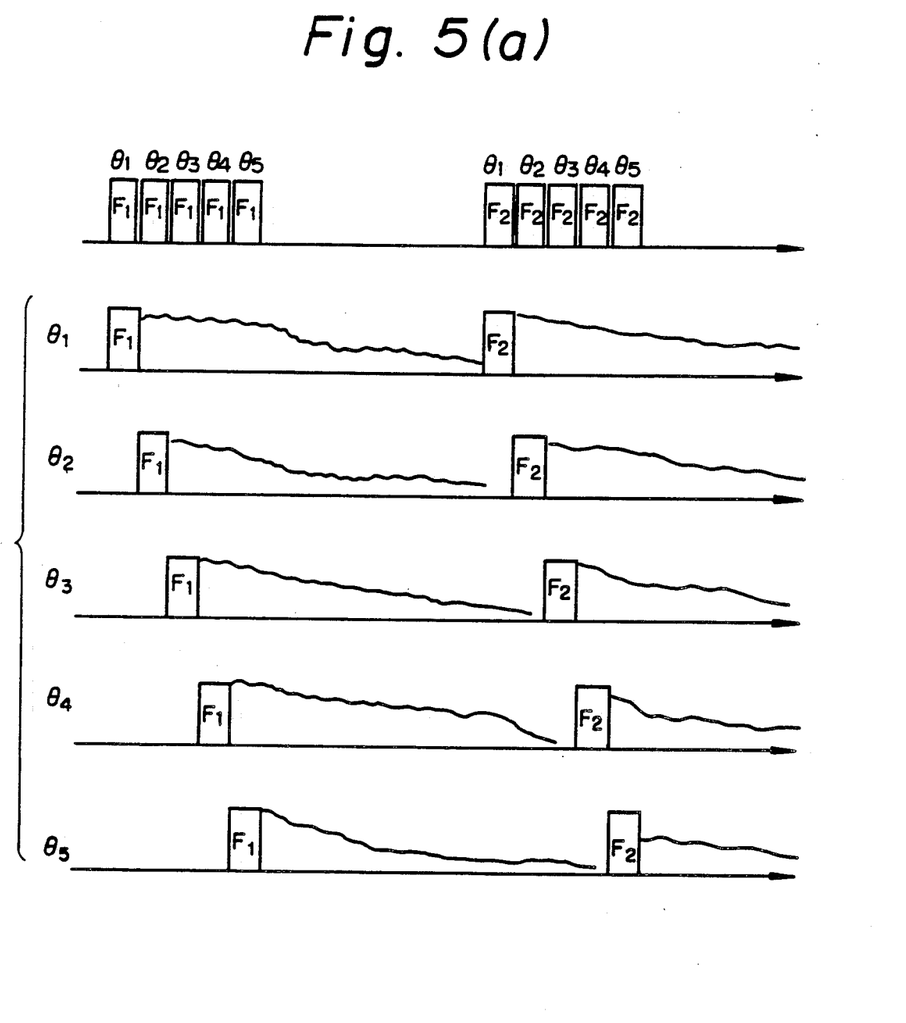
FIGS. 5(a), (b) and (c) respectively illustrate the frequencies transmitted by the transmitting section in the respective scanning periods in the transmission directions as well as the frequencies which the receiving section can receive in each receiving direction and receiving period.

During normal operation, the timing controller 30 synchronously controls the beam scanning control unit 13 and the frequency synthesizer 15 so that, as shown in FIG. 5(a), the electric wave having the same frequency as one of the frequencies selected out of the frequencies $F_1$–$F_5$ is transmitted in sequence to all the directions $\theta_1$–$\theta_5$ in one scanning period, and every time one scanning operation is completed, the transmission frequency is changed to one of the remaining frequencies in such a manner that the frequencies $F_1$–$F_5$ may be transmitted in a predetermined order. According to the pattern shown in FIG. 5(a), the frequencies are so allocated that the frequencies $F_1$-$F_5$ are changed in the order of $F_1$-$F_5$ and transmitted every time one scanning operation is completed.

In this way when a predetermined range is scanned at a high speed by a narrow beam, the frequencies of transmitted electric waves are changed in a predetermined order every time one scanning operation is completed, which makes it difficult for the ESM to measure the frequency of the transmitted electric wave, making it less possible for the receiving section to be subjected to interference.

Figure 5B:
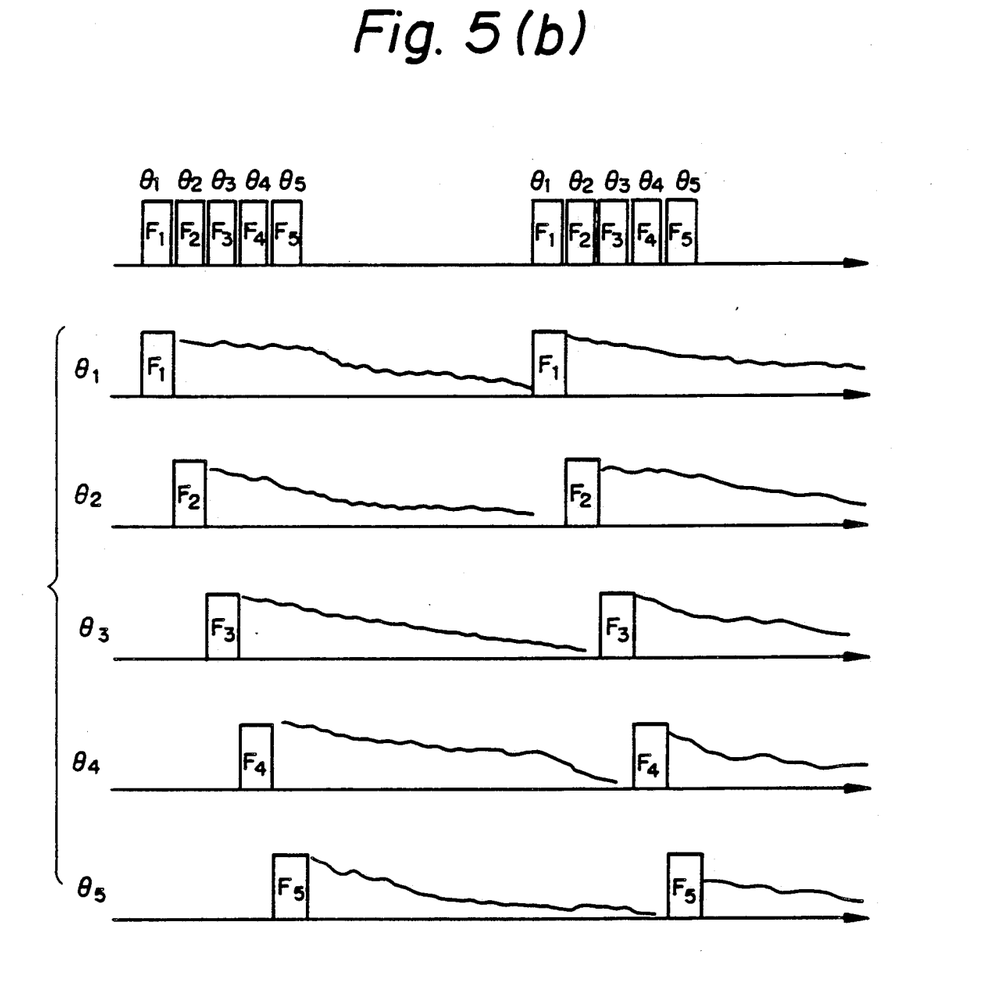
Figure 5C:
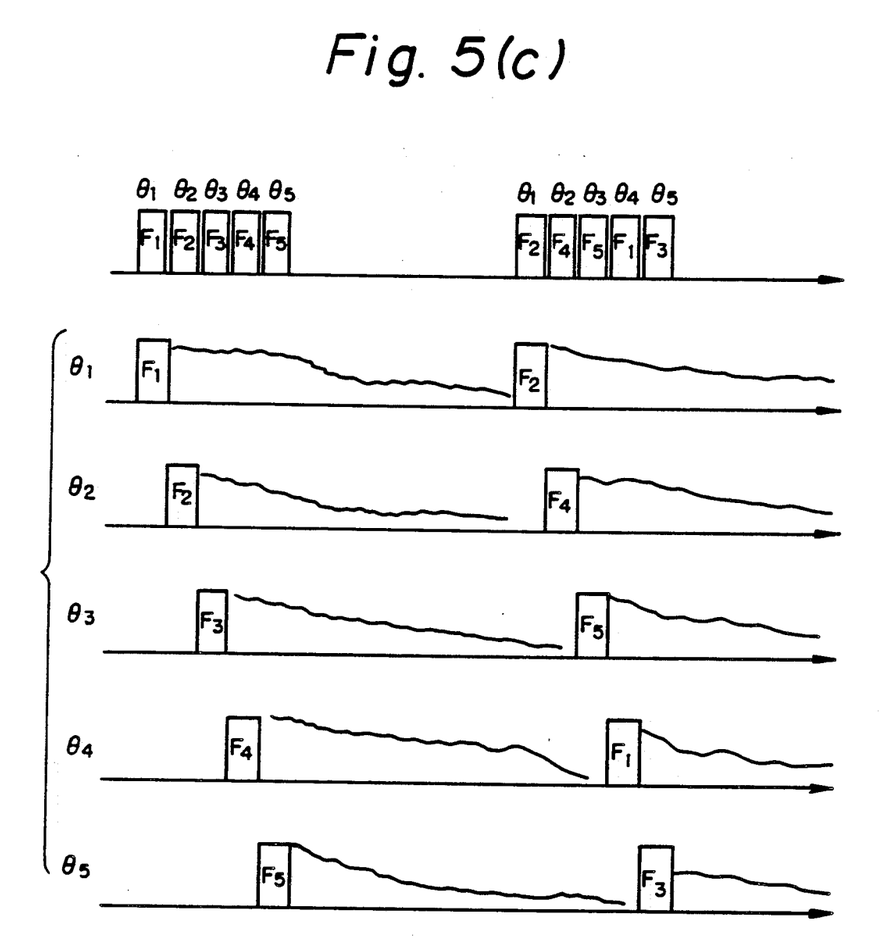

In the above-described mode, if the ESM 3 measures the frequency of the electric wave transmitted from the transmitting section 10 and interferes by transmitting the electric wave having the same frequency, the timing controller 30, in response to directions, frequencies and electric power of the receive signal from the digital beam former, synchronously controls the beam scanning control unit 13 and the frequency synthesizer 15 so that the transmission pattern of the electric wave from the transmitting section 10 may be changed to other patterns as shown in FIG. 5(b) or FIG. 5(c). According to the pattern shown in FIG. 5(b), the frequency $F_1$ is allocated to the transmission direction $\theta_1$, the frequency $F_2$ to the transmitting direction $\theta_2$, the frequency $F_3$ to the transmitting direction $\theta_3$, the frequency $F_4$ to the transmitting direction $\theta_4$ and the frequency $F_5$ to the transmitting direction $\theta_5$, so that the frequencies are cyclically changed every time the transmission direction is changed. Even if the ESM 3 is present in, for example, the transmission direction $\theta_4$, since only the electric wave having the frequency $F_4$ is transmitted in this direction, the interference is caused merely in the direction $\theta_4$. At this time, the echo from the object in the direction $\theta_4$ cannot be received but the echos received from the remaining directions are not affected due to the differences in frequency between the interfering wave and the echos.

In the second transmission mode, since the transmission frequencies are changed periodically in a predetermined order, there is a possibility for the BSM 3 to detect the frequencies. In order to avoid this possibility, the transmission mode having the pattern shown in FIG. 5(c) may be selected. According to this pattern, the frequencies $F_1$-$F_5$ are allocated at pseudo-random in the respective transmission directions $\theta_1$-$\theta_5$ during each scanning period. Every time the scanning operation is completed, correspondence between the transmission directions $\theta_1$-$\theta_5$ and the frequencies $F_1$-$F_5$ are changed. According to this transmission mode, since the frequencies of the electric waves which are transmitted in the respective directions $\theta_1$-$\theta_5$ are changed at random, it makes it extremely difficult for the ESM 3 to measure the frequencies of the transmitted electric waves and also the radar system to be subjected to interference.

The present invention has been described in detail with reference to some embodiments. However, the present invention can be changed and modified in many ways without departing from the scope and spirit of the invention. For example, the combination of the transmission directions and the transmitting frequencies of the electric waves transmitted from the transmitting section may be optionally changed when an interference wave is detected in a particular time zone, or electric waves may be transmitted in a more complicated transmission pattern by combining a plurality of patterns as shown in FIGS. 5(a)-(c).

What is claimed is:

1. A radar system having improved interference resistant characteristics comprising:
   an oscillation means capable of generating a plurality of different frequencies;
   a transmitting antenna means connected to said oscillation means for transmitting an electric wave generating one of the frequencies in different directions in a predetermined sequence to allow a desired area to be scanned;
   a control means for causing said oscillation means and said transmitting antenna means to be operated in any one, or a combination of, at least three transmission modes including a first transmission mode in which the operation timing of said oscillation means and said transmitting antenna means is synchronized and said transmission frequency is changed every time one scanning operation is completed, a second transmission mode in which the transmission frequency is changed in a predetermined order every time the transmission direction is changed during the respective scanning period and a third transmission mode in which the transmission frequency is changed at random every time the transmission direction is changed during the respective scanning period; and
   a receiving means capable of simultaneously forming a plurality of reception beams within the scanning range and converting received signals to corresponding digital signals to output signals indicating the directions and frequencies of the received signals, whereby the transmission mode may be changed depending on the directions and the frequencies of the incoming signals.

2. A radar system as claimed in claim 1 wherein said transmitting antenna means include:
   a phased array antenna means including a plurality of antenna elements connected to said oscillation means, and
   a scanning control means for causing the electric wave to be formed by said phased array antenna means in the different directions in the predetermined sequence so as to cause the desired area to be scanned by the wave.

3. A radar system as claimed in claim 1 wherein said control means operates to cause the frequency generated by said oscillation means to be changed in synchronism with the change in the transmission direction by said scanning control means.

4. A radar system as claimed in claim 3 wherein said oscillation means is a frequency synthesizer capable of generating a plurality of different frequencies and said control means operates to change the oscillation frequency from said frequency synthesizer every time one scanning operation is completed or the transmission direction is changed.

5. A radar system as claimed in claim 1 wherein said receiving means includes:
   a plurality of reception antenna elements capable of receiving incoming electric waves;
   a plurality of filter banks each connected to a corresponding one of said plurality of reception antenna elements to discriminate the plurality of frequencies so as to output signals corresponding respectively to the plurality of frequencies contained in the output signal from the corresponding reception antenna element;
   a plurality of A/D conversion means connected respectively to said filter bank and controlled by said control means, each of said A/D conversion means operating to convert the signals including the plurality of frequencies output from the corresponding filter bank to digital signals; and a digital beam former operable to receive the digital signals output from said plurality of A/D conversion means for performing an arithmetic operation on the digital signals to cause said plurality of reception antenna elements to simultaneously form a plurality of beams in the scanning area so as to output signals indicating the directions and the frequencies of the incoming electric waves.

6. A radar system having improved interference resistance, comprising:
(1) a transmitting section including:
  an oscillation means for generating a plurality of different frequencies; and
  an array antenna means including a plurality of antenna elements connected to said oscillation means and capable of transmitting an electric wave in different directions in a predetermined sequence to cause a desired area to be scanned, said beam having a plurality of frequencies;
(2) a control means for causing said oscillation means and said array antenna means to be synchronously operated so as to operate said transmitting section in one, or a combination of, at least three transmission modes including a first transmission mode in which said transmission frequency is changed every time one scanning operation is completed, a second transmission mode in which the transmission frequency is changed in a predetermined order every time the transmitting direction is changed in the respective scanning period and a third transmission mode in which the transmission frequency is changed at random every time the transmission direction is changed during respective scanning period; and
(3) a receiving section including:
  a plurality of reception antenna elements for receiving incoming electric waves;
  a filter means connected to said plurality of reception antenna elements and capable of discriminating the plurality of frequencies to output signals corresponding to the respective components of the plurality of frequencies contained in the respective signals output from said plurality of reception antenna elements;
  a conversion means controlled by said control means for converting the signals output from said filter means to digital signals; and
  an operation means which receives the digital signals output from said conversion means so as to perform an arithmetic operation on the digital signals so as to cause said reception antenna elements to simultaneously from a plurality of beams in the scanned area to output signals indicating the directions and the frequencies of the incoming electric waves, whereby the operation mode of said transmitting section may be changed depending on the directions and the frequencies of the incoming electric waves.

7. A radar system as claimed in claim 6 wherein said array antenna means comprises a phased array antenna including said plurality of antenna elements and a scanning control means for causing said phased array antenna to form beam in the different directions in a predetermined sequence so as to allow the desired area to be scanned.

8. A radar system as claimed in claim 6 wherein said control means operates to cause the frequency generated by said oscillation means to be changed in synchronism with a change in the transmission direction by said scanning control means.

9. A radar system as claimed in claim 8 wherein said oscillation means is a frequency synthesizer capable of generating a plurality of frequencies and said control means operates to cause the oscillation frequency of said frequency synthesizer to be changed every time one scanning operation is completed or every time the transmission direction is changed.

10. A radar system as claimed in claim 6 wherein:
(1) said filter means comprises a plurality of filter banks each connected to a corresponding one of said plurality of reception antenna elements to discriminate the plurality of frequencies so as to output signals corresponding respectively to said plurality of frequencies contained in the output signals from the corresponding reception antenna element,
(2) said conversion means comprises a plurality of A/D conversion means respectively connected to said filter banks and controlled by said control means, each of said A/D conversion means operating to convert the signals output from the corresponding filter bank to the digital signals, and
(3) said operation means is a digital beam former operable to receive the digital signals output from said plurality of A/D conversion means for performing an arithmetic operation on the digital signals to cause said plurality of reception antenna elements to simultaneously form a plurality of beams in the scanned area so as to output signals indicating the direction and frequencies of the incoming electric waves.

11. A radar system as claimed in claim 10 wherein said control means causes the transmission mode to be changed in accordance with the directions and the frequencies of the incoming electric waves output from said digital beam former.

12. A radar system having improved interference resistance, comprising:
(1) a transmitting section including:
  an oscillation means for generating a plurality of different frequencies;
  a phased array antenna means including a plurality of antenna elements connected to said oscillation means; and
  a scanning control means for causing said antenna elements to form a beam in different transmission directions in a predetermined sequence to allow a desired area to be scanned, said beam having a plurality of frequencies;
(2) a control means for operating said oscillation means to change the oscillation frequency in synchronism with the change in the transmission direction by said scanning control means to operate said transmitting section in any one, of or a combination of, at least three transmission modes including a first transmission mode in which the transmission frequency is changed every time one scanning operation is completed, a second transmission mode in which the transmission frequency is changed in a predetermined order every time when the transmission direction is changed during the respective scanning period and a third transmission mode in which the transmission frequency is changed at random every time when the transmission direction is changed during the respective scanning period; and (3) a receiving section including:
a plurality of reception antenna elements capable of receiving incoming electric waves;
a plurality of filter banks each connected to a corresponding one of said plurality of reception antenna elements to discriminate the plurality of frequencies so as to output signals of the plurality of frequencies contained in the output signals from the corresponding reception antenna element;
a plurality of A/D conversion means each connected to a corresponding one of said filter banks and controlled by said control means to convert the signals of the plurality of frequencies output from the corresponding filter bank to digital signals; and
a digital beam forming means which receives the digital signals output from said A/D conversion means, and caused said plurality of reception antenna elements to simultaneously from a plurality of beams in the scanned area to output signals indicating the directions and the frequencies of the incoming electric waves, including jamming signals, whereby the operation mode of said transmitting section may be changed in accordance with the directions and the frequencies of the incoming electric waves.

13. A radar system as claimed in claim 12 wherein said control means operates said oscillation means to change the frequency in synchronism with the change in the transmission direction by said scanning control means.

14. A radar system as claimed in claim 13 wherein said oscillation means is a frequency synthesizer capable of generating a plurality of frequencies and said control means causes the oscillation frequency from said frequency synthesizer to be changed every time one scanning operation is completed or the transmission direction is changed.

15. A radar system as claimed in claim 12 wherein said control means causes the transmission mode to be changed in accordance with the directions and the frequencies of the incoming electric signals output from said digital beam forming means.

16. A radar system as claimed in claim 11 wherein said incoming signals include jamming signals.

17. A radar system as claimed in claim 15 wherein said incoming signals include jamming signals.

* * * * *